US010310903B2

(12) United States Patent
McPherson et al.

(10) Patent No.: US 10,310,903 B2
(45) Date of Patent: Jun. 4, 2019

(54) RESILIENT SCHEDULING OF BROKER JOBS FOR ASYNCHRONOUS TASKS IN A MULTI-TENANT PLATFORM-AS-A-SERVICE (PAAS) SYSTEM

(71) Applicant: Red Hat, Inc., Raleigh, NC (US)

(72) Inventors: Daniel McPherson, Raleigh, NC (US); Abhishek Gupta, Sunnyvale, CA (US); Jordan Liggitt, Fuquay-Varina, NC (US)

(73) Assignee: Red Hat, Inc., Raleigh, NC (US)

( * ) Notice: Subject to any disclaimer, the term of this patent is extended or adjusted under 35 U.S.C. 154(b) by 68 days.

(21) Appl. No.: 14/158,164

(22) Filed: Jan. 17, 2014

(65) Prior Publication Data

US 2015/0205634 A1 Jul. 23, 2015

(51) Int. Cl.
*G06F 9/46* (2006.01)
*G06F 9/50* (2006.01)
*G06F 11/14* (2006.01)

(52) U.S. Cl.
CPC ............ *G06F 9/5027* (2013.01); *G06F 9/466* (2013.01); *G06F 9/5038* (2013.01); *G06F 11/1474* (2013.01); *G06F 2209/5013* (2013.01); *G06F 2209/5017* (2013.01)

(58) Field of Classification Search
CPC .. G06F 9/50–9/5055; G06F 2209/5013; G06F 2209/5017; G06F 2209/509
USPC .................................................. 718/102–104
See application file for complete search history.

(56) References Cited

U.S. PATENT DOCUMENTS 5,630,047 A * 5/1997 Wang .................. G06F 11/1438 714/15
5,924,097 A * 7/1999 Hill ....................... G06F 9/5027 707/703
6,179,489 B1 * 1/2001 So et al. ....................... 718/102
6,263,358 B1 * 7/2001 Lee ......................... G06F 8/458 718/100
6,298,370 B1 * 10/2001 Tang et al. .................... 718/102
6,438,573 B1 * 8/2002 Nilsen ........................... 718/100

(Continued)

OTHER PUBLICATIONS

Sheng, D., et al., Optimization of Cloud Task Processing with Checkpoint-Restart Mechanism, Proceedings of the International Conference on High Performance Computing, Networking, Storage and Analysis, 2013, 12 pages, [retrieved on Dec. 11, 2018], Retrieved from the Internet: <URL:http://ieeexplore.ieee.org/>.*

(Continued)

*Primary Examiner* — Geoffrey R St. Leger
(74) *Attorney, Agent, or Firm* — Lowenstein Sandler LLP

(57) ABSTRACT

Implementations for resilient scheduling of broker jobs for asynchronous tasks in a multi-tenant Platform-as-a-Service (PaaS) system are disclosed. A method of the disclosure includes receiving, by the processing device of a broker of a multi-tenant PaaS system from a user of the multi-tenant PaaS system, a request to complete a job, adding, by the processing device, an entry corresponding to the requested job in a data store of the broker, adding, by the processing device, another entry corresponding to the requested job in a scheduler communicably coupled to the broker, and sending, by the processing device to the user, an acknowledgment of the request and an identifier (ID) of the job, wherein the job is processed asynchronous to the sending of the acknowledgment.

21 Claims, 5 Drawing Sheets

(56) References Cited

U.S. PATENT DOCUMENTS

| | | | | |
|---|---|---|---|---|
| 6,988,139 | B1 * | 1/2006 | Jervis | G06F 9/5038 709/224 |
| 8,276,148 | B2 * | 9/2012 | Cho | G06F 9/4881 718/102 |
| 8,965,860 | B2 * | 2/2015 | Cheenath | G06F 17/3038 707/703 |
| 9,116,746 | B2 * | 8/2015 | Shafiee | G06F 9/5038 |
| 9,524,192 | B2 * | 12/2016 | van Velzen | G06F 9/5038 |
| 2004/0059995 | A1 * | 3/2004 | Takabayashi et al. | 715/500 |
| 2004/0249684 | A1 * | 12/2004 | Karppinen | 705/5 |
| 2005/0240916 | A1 * | 10/2005 | Sandrew | G06Q 10/06 717/154 |
| 2007/0244650 | A1 * | 10/2007 | Gauthier | 702/19 |
| 2010/0211815 | A1 * | 8/2010 | Mankovskii et al. | 714/2 |
| 2011/0138391 | A1 * | 6/2011 | Cho | G06F 9/4881 718/102 |
| 2011/0246434 | A1 * | 10/2011 | Cheenath | G06F 17/3038 707/703 |
| 2011/0276977 | A1 * | 11/2011 | van Velzen | G06F 9/5038 718/104 |
| 2012/0159494 | A1 * | 6/2012 | Shafiee | G06F 9/5038 718/102 |
| 2012/0324449 | A1 * | 12/2012 | Huetter et al. | 718/1 |
| 2013/0304903 | A1 * | 11/2013 | Mick et al. | 709/224 |
| 2014/0009792 | A1 * | 1/2014 | Kanamori | G06F 3/1207 358/1.15 |
| 2014/0067792 | A1 * | 3/2014 | Erdogan | G06F 17/30575 707/718 |
| 2014/0075032 | A1 * | 3/2014 | Vasudevan et al. | 709/226 |
| 2014/0136443 | A1 * | 5/2014 | Kinsey et al. | 705/347 |
| 2014/0304545 | A1 * | 10/2014 | Chen | G06F 9/46 714/4.3 |
| 2014/0380307 | A1 * | 12/2014 | Zhu | G06F 9/45533 718/1 |
| 2015/0052218 | A1 * | 2/2015 | Zhang et al. | 709/217 |

OTHER PUBLICATIONS

Okorafor, E., A Fault-tolerant High Performance Cloud Strategy for Scientific Computing, IEEE International Symposium on Parallel and Distributed Processing Workshops and Phd Forum, 2011, pp. 1525-1532, [retrieved on Dec. 11, 2018], Retrieved from the Internet: <URL:http://ieeexplore.ieee.org/>.*

* cited by examiner

RESILIENT SCHEDULING OF BROKER JOBS FOR ASYNCHRONOUS TASKS IN A MULTI-TENANT PLATFORM-AS-A-SERVICE (PAAS) SYSTEM

TECHNICAL FIELD

The implementations of the disclosure relate generally to computing infrastructures and, more specifically, relate to resilient scheduling of broker jobs for asynchronous tasks in a multi-tenant Platform-as-a-Service (PaaS) system.

BACKGROUND

Currently, a variety of Platform-as-a-Service (PaaS) offerings exist that include software and/or hardware facilities for facilitating the execution of web applications. In some cases, these PaaS offerings utilize a cloud computing environment (the "cloud") to support execution of the web applications. Cloud computing is a computing paradigm in which a customer pays a "cloud provider" to execute a program on computer hardware owned and/or controlled by the cloud provider. It is common for cloud providers to make virtual machines hosted on its computer hardware available to customers for this purpose.

The cloud provider typically provides an interface that a customer can use to requisition virtual machines and associated resources such as processors, storage, and network services, etc., as well as an interface a customer can use to install and execute the customer's program on the virtual machines that the customer requisitions, together with additional software on which the customer's program depends. For some such programs, this additional software can include software components, such as a kernel and an operating system, and/or middleware and a framework. Customers that have installed and are executing their programs "in the cloud" typically communicate with the executing program from remote geographic locations using Internet protocols.

PaaS offerings typically facilitate deployment of web applications without the cost and complexity of buying and managing the underlying hardware, software, and provisioning hosting capabilities, providing the facilities to support the complete life cycle of building, delivering, and servicing web applications that are entirely available from the Internet. Typically, these facilities operate as one or more virtual machines (VMs) running on top of a hypervisor in a host server.

BRIEF DESCRIPTION OF THE DRAWINGS

The disclosure will be understood more fully from the detailed description given below and from the accompanying drawings of various implementations of the disclosure. The drawings, however, should not be taken to limit the disclosure to the specific implementations, but are for explanation and understanding only.

DETAILED DESCRIPTION

Implementations of the disclosure provide for resilient scheduling of broker jobs for asynchronous tasks in a multi-tenant Platform-as-a-Service (PaaS) system. In one implementation, a scheduler and worker components are provided to schedule broker jobs for asynchronous processing with respect to the web request for the job. Currently in PaaS environments, operations that arrive at the PaaS environment via a user request, such as a web request, are typically executed immediately as part of the web request for the operation. This can be a bottleneck for the PaaS management as numerous operations are typically performed, and some of these operations take longer than others. Some operations may be blocked by concurrent operations already occurring in the system. In addition, hard timeouts for the web request may result in failures of web requests for some operations.

Implementations of the disclosure overcome the drawbacks of current solutions by offloading processing of operations of a web request from the web request itself in a resilient manner. The scheduler of implementations of the disclosure receives incoming requests to the broker server as part of a web request. These incoming requests may include, but are not limited to, creating a new application, adding a component to an existing application, building an application, deploying an application, deleting an application, scaling up/down an application, distributing Secure Shell (SSH) keys, distributing environment variables, and so on.

In one implementation, the scheduler schedules a job corresponding to the request separately from the web request. The scheduled job is queued for processing in the background of the broker server and the broker server can immediately respond to the web request without delay due to the pending job processing. The broker server may respond to the web request without waiting for any associated job to be performed or completed. The job processing is accordingly offloaded or separated from the web request by the scheduler and is performed in the background by worker components of the broker server separate from the web request. In addition, while the job is being processed, the broker server can provide status information to the user corresponding to the job processing.

Figure 1:
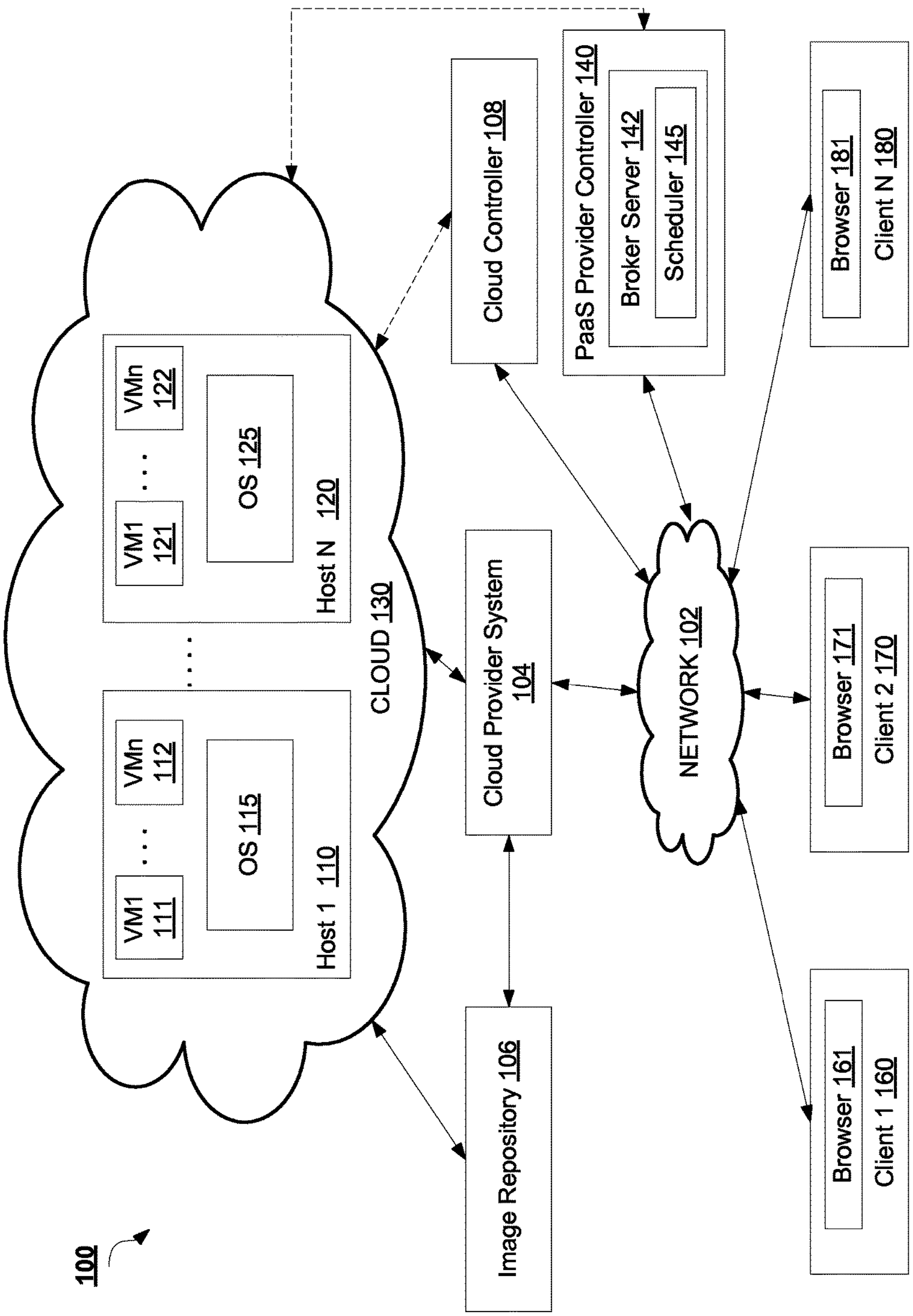
FIG. 1 is a block diagram of a network architecture in which implementations of the disclosure may operate.

FIG. 1 is a block diagram of a network architecture 100 in which implementations of the disclosure may operate. The network architecture 100 includes a cloud 130 managed by a cloud provider system 104. The cloud provider system 104 provides nodes to execute software and/or other processes. In some implementations, these nodes are virtual machines (VMs), such as VMs 111, 112, 121, and 122 hosted in cloud 130. Each VM 111, 112, 121, 122 is hosted on a physical machine, such as host 1 110 through host N 120, configured as part of the cloud 130. The VMs 111, 112, 121, 122 may be executed by OSes 115, 125 on each host machine 110, 120.

In some implementations, the host machines 110, 120 are often located in a data center. For example, VMs 111 and 112 are hosted on physical machine 110 in cloud 130 provided by cloud provider 104. Users can interact with applications executing on the cloud-based VMs 111, 112, 121, 122 using client computer systems, such as clients 160, 170 and 180, via corresponding web browser applications 161, 171 and 181. In other implementations, the applications may be hosted directly on hosts 1 through N 110-120 without the use of VMs (e.g., a "bare metal" implementation), and in such an implementation, the hosts themselves are referred to as "nodes".

Clients 160, 170 and 180 are connected to hosts 110, 120 on cloud 130 and the cloud provider system 104 via a network 102, which may be a private network (e.g., a local area network (LAN), a wide area network (WAN), intranet, or other similar private networks) or a public network (e.g., the Internet). Each client 160, 170, 180 may be a mobile device, a PDA, a laptop, a desktop computer, a tablet computing device, a server device, or any other computing device. Each host 110, 120 may be a server computer system, a desktop computer or any other computing device. The cloud provider system 104 may include one or more machines such as server computers, desktop computers, etc.

In one implementation, the cloud provider system 104 is coupled to a cloud controller 108 via the network 102. The cloud controller 108 may reside on one or more machines (e.g., server computers, desktop computers, etc.) and may manage the execution of applications in the cloud 130. In some implementations, cloud controller 108 receives commands from PaaS provider controller 140. Based on these commands, the cloud controller 108 provides data (e.g., such as pre-generated images) associated with different applications to the cloud provider system 104. In some implementations, the data may be provided to the cloud provider 104 and stored in an image repository 106, or in an image repository (not shown) located on each host 110, 120, or in an image repository (not shown) located on each VM 111, 112, 121, 122. This data is used for the execution of applications for a multi-tenant PaaS system managed by the PaaS provider controller 140.

In one implementation, the PaaS provider controller 140 includes a broker server 142 with at least one scheduler 145 to provide resilient scheduling of broker jobs for asynchronous tasks in a multi-tenant PaaS. The scheduler(s) 145 receives incoming requests to the broker server 142 as part of a web request. These incoming requests may include, but are not limited to, creating a new application, adding a component to an existing application, building an application, deploying an application, deleting an application, scaling up/down an application, distributing Secure Shell (SSH) keys, distributing environment variables, and so on.

In one implementation, the scheduler 145 schedules a job corresponding to the request separately from the web request. The scheduled job is queued for processing in the background of the broker server 142 and the broker server 142 can immediately respond to the web request without delay due to the pending job processing. The job processing is accordingly offloaded or separated from the web request by the scheduler 145 and is performed in the background by the broker server 142 separate from the web request. In addition, while the job is being processed, the broker server 142 can provide status information to the user corresponding to the job processing. Further details of resilient scheduling of broker jobs for asynchronous tasks in a multi-tenant PaaS are described below with respect to FIG. 2.

While various implementations are described in terms of the environment described above, those skilled in the art will appreciate that the facility may be implemented in a variety of other environments including a single, monolithic computer system, as well as various other combinations of computer systems or similar devices connected in various ways. For example, the data from the image repository 106 may run directly on a physical host 110, 120 instead of being instantiated on a VM 111, 112, 121, 122.

Figure 2:
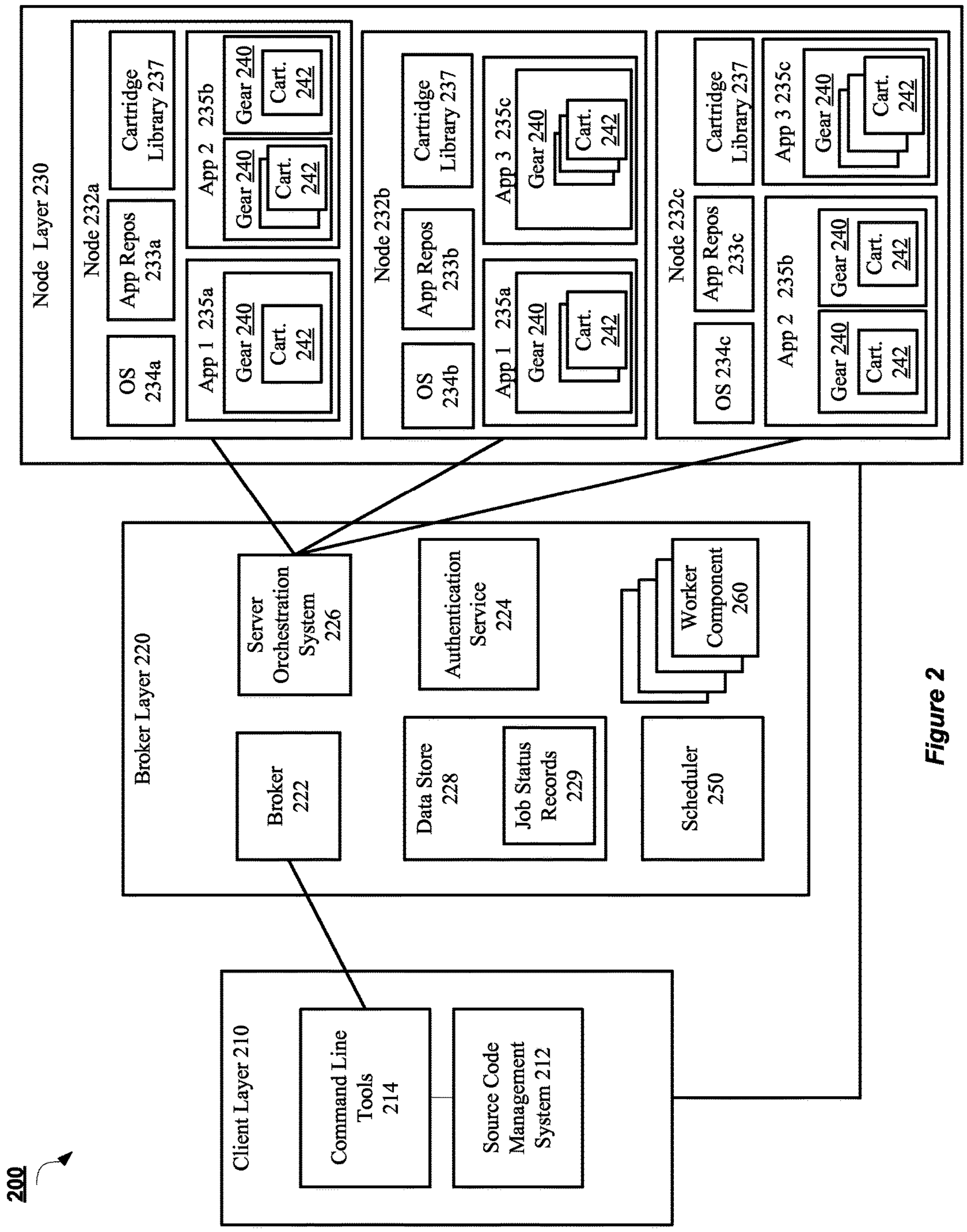
FIG. 2 is a block diagram of a PaaS system architecture according to an implementation of the disclosure.

FIG. 2 is a block diagram of a PaaS system architecture 200 according to an implementation of the disclosure. The PaaS architecture 200 allows users to launch software applications in a cloud computing environment, such as cloud computing environment provided in network architecture 100 described with respect to FIG. 1. The PaaS system architecture 200, in one implementation, includes a client layer 210, a broker layer 220, and a node layer 230.

In one implementation, the client layer 210 resides on a client machine, such as a workstation of a software developer, and provides an interface to a user of the client machine to a broker layer 220 of the PaaS system 200. For example, the broker layer 220 may facilitate the creation and deployment on the cloud (via node layer 230) of software applications being developed by an end user at client layer 210.

In one implementation, the client layer 210 includes a source code management system 212, sometimes referred to as "SCM" or revision control system. One example of such an SCM or revision control system is Git, available as open source software. Git, and other such distributed SCM systems, usually include a working directory for making changes, and a local software repository for storing the changes for each application associated with the end user of the PaaS system 200. The packaged software application can then be "pushed" from the local SCM repository to a remote SCM repository, such as app repos 233*a*, 233*b*, 233*c*, at the node(s) 232*a*, 232*b*, 232*c* running the associated application. From the remote SCM repository 233*a*, 233*b*, 233*c*, the code may be edited by others with access, or the application may be executed by a machine. Other SCM systems work in a similar manner.

The client layer 210, in one implementation, also includes a set of command line tools 214 that a user can utilize to create, launch, and manage applications. In one implementation, the command line tools 214 can be downloaded and installed on the user's client machine, and can be accessed via a command line interface or a graphical user interface, or some other type of interface. In one implementation, the command line tools 214 make use of an application programming interface ("API") of the broker layer 220 and perform other applications management tasks in an automated fashion using other interfaces, as will be described in more detail further below in accordance with some implementations.

In one implementation, the broker layer 220 acts as middleware between the client layer 210 and the node layer 230. The node layer 230 includes the nodes 232*a-c* on which software applications 235*a-c* are provisioned and executed. In one implementation, each node 232*a-c* is a VM provisioned by an Infrastructure-as-a-Service (IaaS) provider. In other implementations, the nodes 232*a-c* may be physical machines (e.g., bare metal) or VMs residing on a single physical machine and running gears (discussed below) that provide functionality of applications of a multi-tenant PaaS system. In one implementation, the broker layer 220 is implemented on one or more machines, such as server computers, desktop computers, etc. In some implementations, the broker layer 220 may be implemented on one or more machines separate from machines implementing each of the client layer 210 and the node layer 230, or may implemented together with the client layer 210 and/or the node layer 230 on one or more machines, or some combination of the above.

In one implementation, the broker layer 220 includes a broker 222 that coordinates requests from the client layer 210 with actions to be performed at the node layer 230. One such request is new application creation. In one implementation, when a user, using the command line tools 214 at client layer 210, requests the creation of a new application 235*a-c*, or some other action to manage the application 235*a-c*, the broker 222 first authenticates the user using an authentication service 224. In one implementation, the authentication service may comprise custom authentication methods, or standard protocols such as SAML, OAuth, etc. Once the user has been authenticated and allowed access to the system by authentication service 224, the broker 222 uses a server orchestration system 226 to collect information and configuration information about the nodes 232*a-c*.

In one implementation, the broker 222 uses the Marionette Collective™ ("MCollective™") framework available from Puppet Labs™ as the server orchestration system 226, but other server orchestration systems may also be used. The server orchestration system 226, in one implementation, functions to coordinate server-client interaction between multiple (sometimes a large number of) servers. In one implementation, the servers being orchestrated are nodes 232*a-c*, which are acting as application servers and web servers.

In one implementation, the broker 222 manages the business logic and model representing the nodes 232*a-c* and the applications 235*a-c* residing on the nodes, and acts as a controller that generates the actions requested by users via an API of the client command line tools 214. The server orchestration system 226 then takes the actions generated by the broker 222 and orchestrates their execution on the many nodes 232*a-c* managed by the system.

In one implementation, the information collected about the nodes 232*a-c* can be stored in a data store 228. In one implementation, the data store 228 can be a locally-hosted database or file store, or it can be a cloud based storage service provided by a Storage-as-a-Service (SaaS) provider, such as Amazon™ S3™ (Simple Storage Service). The broker 222 uses the information about the nodes 232*a-c* and their applications 235*a-c* to model the application hosting service and to maintain records about the nodes. In one implementation, data of a node 232*a-c* is stored in the form of a JavaScript Object Notation (JSON) blob or string that maintains key-value pairs to associate a unique identifier, a hostname, a list of applications, and other such attributes with the node.

In implementations of the disclosure, the PaaS system architecture 200 of FIG. 2 is a multi-tenant PaaS environment. In a multi-tenant PaaS environment, each node 232*a-c* runs multiple applications 235*a-c* that may be owned or managed by different users and/or organizations. As such, a first customer's deployed applications 235*a-c* may coexist with any other customer's deployed applications on the same node 232 (VM) that is hosting the first customer's deployed applications 235*a-c*. In some implementations, portions of an application are run on multiple different nodes 232*a-c*. For example, as shown in FIG. 2, components of application 1 235*a* are run in both node 232*a* and node 232*b*. Similarly, application 2 235*b* is run in node 232*a* and node 232*c*, while application 3 235*c* is run in node 232*b* and node 232*c*.

In addition, each node also maintains a cartridge library 237. The cartridge library 237 maintains multiple software components (referred to herein as cartridges) that may be utilized by applications 235*a-c* deployed on node 232*a-c*. A cartridge can represent a form of support software (or middleware) providing the functionality, such as configuration templates, scripts, dependencies, to run an application 235*a-c* and/or add a feature to an application, 235*a-c*. In one implementation, the cartridges support languages such as, but not limited to, JBoss™, PHP, Ruby, Python, Perl, and so on. In addition, cartridges may be provided that support databases, such as MySQL™, PostgreSQL™, Mongo™, and others. Cartridges may also be available that support the build and continuous integration environments, such as a Jenkins cartridge. Lastly, cartridges may be provided to support management capabilities, such as PHPmyadmin, RockMongo™, 10gen-mms-agent, cron scheduler, and HAProxy, for example. Adding an instance of a cartridge from cartridge library 237 to an application 235*a-c* provides a capability for the application 235*a-c*, without the customer who owns the application having to administer or update the included capability.

In one implementation, each node 232*a-c* is implemented as a VM and has an operating system 234*a-c* that can execute applications 235*a-c* using the app repos 233*a-c* and cartridge libraries 237 that are resident on the nodes 232*a-c*. Each node 302*a-b* also includes a server orchestration system agent (not shown) configured to track and collect information about the node 232*a-c* and to perform management actions on the node 232*a-c*. Thus, in one implementation, using MCollective™ as the server orchestration system 226, the server orchestration system agent at the node 232*a-c* can act as a MCollective™ server. The server orchestration system 226 would then act as the MCollective™ client that can send requests, queries, and commands to the MCollective™ server agent on node 232*a-c*.

As previously mentioned, cartridges provide the underlying support software that implements the functionality of applications 235*a-c*. In one implementation, an application 235*a-c* may utilize one or more cartridge instances 242 that are run in one or more resource-constrained gears 240 on nodes 232*a-c*. Cartridge library 237 provides an OS-based location, outside of all application gears 240, that acts as a source for cartridge instantiations 242 that provide functionality for an application 235*a-c*.

An application 235*a-c* may use more than one cartridge instance 240 as part of providing functionality for the application 235*a-b*. One example of this is a JavaEE application that uses a JBoss™ AS7 cartridge with a supporting MySQL™ database provided by a MySQL™ cartridge. Each cartridge instance 242 may include a software repository that provides the particular functionality of the cartridge instance 242.

As mentioned above, a gear 240 is a resource-constrained process space on the node 232*a-c* to execute functionality of an application 235*a-c*. In some implementations, a gear 240 is established by the node 232*a-c* with resource boundaries, including a limit and/or designation of the amount of memory, amount of storage, and security types and/or labels to be applied to any functions executed by the gear 240. In one implementation, gears 240 may be established using the Linux Containers (LXC) virtualization method. In further implementations, gears 240 may also be established using cgroups, SELinux™, and kernel namespaces, to name a few examples. As illustrated in FIG. 2, cartridges instances 242 for an application 235*a-c* may execute in gears 240 dispersed over more than one node 232*a-b*. In other implementations, cartridge instances 242 for an application 235*a-c* may run in one or more gears 240 on the same node 232*a-c*.

Implementations of the disclosure provide for resilient scheduling of broker jobs for asynchronous tasks in a multi-tenant PaaS by broker layer 220. In one implementation, broker layer 220 includes at least one scheduler 250 and worker components 260 to provide scheduling of broker jobs for asynchronous tasks in the multi-tenant PaaS 200. In one implementation, scheduler 250 is the same as scheduler 145 described with respect to FIG. 1.

In one implementation, broker 222 receives incoming requests from the client layer 210. For example, the incoming requests can arrive in the form a HyperText Transport Protocol (HTTP) Representational State Transfer (REST) Application Programming Interface (API) call (hereinafter HTTP REST API call). These incoming requests may be requests to perform a job including, but are not limited to, creating a new application, adding a component to an existing application, building an application, deploying an application, deleting an application, scaling up/down an application, distributing Secure Shell (SSH) keys, distributing environment variables, and so on.

In response to receiving a request to perform a job, the broker 222 may store an entry in the broker's data store 228 indicating details of the corresponding job of the request, including a job identifier (ID). In one implementation, this entry may be stored in a database of job status records 229 that is part of data store 228. In addition, the broker 222 may queue an entry in scheduler 250 referencing back to the job details maintained in job status records 229. In one implementation, a pointer to the application identifier (ID), domain ID, and/or user ID corresponding to the job is added to the scheduler 250.

In some implementations, there may be a one-to-one correspondence between brokers 222 and schedulers 250, where all incoming requests to a broker 222 are scheduled to the corresponding scheduler 250 of that broker 222. However, other implementations are also possible, such as a random assignment of incoming requests to a broker to any of a plurality of schedulers 250 in the PaaS environment. Another implementation may utilize one or more centralized schedulers 250 (e.g., may be scalable for reliability guarantees) to handle requests from all brokers 222 in a PaaS environment. Various scheduler implementations are envisioned and possible in embodiments of the disclosure.

After the entries corresponding to the job request are added to the broker data store 228 and the scheduler 250, the broker 22 may respond to the request with an acknowledgment and the ID for the job. The requesting client may then utilize this provided job ID to query for status of processing of the job (e.g., in progress, waiting, complete, failed, etc.) from the broker 222.

With respect to the scheduler 250, when a job is queued by the broker 222 to the scheduler 250, one of multiple worker components 260 "reserve" the job to work on. The worker components 260 may be a pool of processing threads of a server machine executing the broker 222. For example, when the scheduler 250 is implemented using Beanstalkd™, each worker component 260 may be implemented using Backburner™ or Beaneater™ protocols. The worker components 260 each include specialized knowledge of the broker 222 environment and are able to execute broker 222 tasks. For example, each worker component 260 may load a Rails™ environment of the broker 222. The worker components 260 can load a model of the broker 222 in order to understand what an application is, what a domain is, how to interact with objects of the broker 222, as well as how to interact with proxies that communicate with the nodes 232*a-c*, and so on.

Various queuing models may be utilized by scheduler 250 and worker components 260 to assign jobs to worker components 260. For example, a first-in-first out (FIFO) scheduling algorithm may be utilized by scheduler 250 and worker components 260. Other queuing theories and scheduling algorithms may be implemented in embodiments of the disclosure. For example, each job in the scheduler 250 may be assigned a priority for processing, with higher-priority jobs removed from the scheduler 250 before lower priority jobs. Priority may be assigned based on the type of job, processing history of the job (e.g., previously failed and on re-try attempt, time delay corresponding to the job processing), service level corresponding to the job, and so on.

When a worker component 260 begin processing a job, the worker component 260 first elaborates the job into a series of smaller operations (referred to as "elaborated operations", "sub-operations", or "sub-ops") that can each be retired or rolled back individually. In one implementation, the series of sub-ops for a particular job is pre-configured and known by the worker component 260 as part of the broker 222 model. For example, for the job of creating an application, the elaborated operations or sub-ops may include, but are not limited to, determine given cartridges and gear types for the application, determine what locations to obtain the given gears from, associate the obtained gears with the application, determine how many gears are necessary for the application, determine where the those gears belong, determine what cartridges execute on which gears, and so on.

The elaborated operations may then be stored in the data store 228 of the broker layer 220 and associated with the job. Then, each of the elaborated operations is transactionally executed by the worker component 260 as part of processing of the job. Each elaborated operation that is completed is marked as complete, and failures are re-tried as appropriate. Each elaborated step may be flaggable for a roll-back policy, a re-try number and delay interval, and whether manual intervention is allowed before marked as failed. The roll-back policy may specify how the elaborate operation rolls back (e.g., specifying if there is a group of operations that should roll back together, etc.). The re-try number and delay may specify the number of re-tries for the elaborated operation and the intervals between each re-try (e.g., 10-min re-try, then 1 hr re-try, then 6 hrs re-try, then marked as failed; double each subsequent interval up to a certain number of re-tries before failure; etc.). In one implementation, the roll-back and re-try policy flags for each elaborated operation is pre-configured and known by the worker component 260 as part of the broker 222 model.

When a job fails due to a failure of an elaborated operation and is flagged for re-try, the job is placed back into the scheduler by the worker component 260. A variety of different queuing policies may apply to the job at this juncture. For example, the job may not be available for processing by another worker component 260 until a flagged time interval has expired. This may allow time for underlying issues causing the job's failure to be resolved before the job is re-tried again, etc. In this case, the job may be marked as not available, and then when the time interval expires, the job may be marked with a higher priority in order to be quickly picked up by a worker component 260, or may be placed into the existing queuing protocol utilized by the scheduler 250 without any special treatment.

When all of the elaborated operations of a job completed successfully, the job is considered completed and marked accordingly (e.g., successful). The job is then pruned of its elaborated operations. Consistently failed jobs are logged with an opportunity for administrative manual intervention.

As previously discussed, the broker 222 can provide status information of a job to the user requesting the job. A status of the job is stored in the job status records 229. A job entry in the job status record 229 may include a variety of fields, such as, but not limited to, a job ID, job type, title, description, arguments, child jobs, parent job, state, completion status, retry count, rollback retry count, percentage complete, result, object type, application id, application name, domain name, owner login, creator login, and object URL. A job entry in the job status records 229 may include a job status/state field. When a job is initially scheduled by the broker 222 to the scheduler 250, the job status field is set to "scheduled" (or something similar). When a worker begins processing a job and elaborates the operations of the job, each operation is stored with the job entry in the job status records 229, and provided a corresponding job status field. When the worker component 260 successfully completes an elaborated operation of a job, the job status field for that corresponding elaborated operation is updated to "completed" or any other similar signifier.

To obtain an exact state of a job, the pending operation for the relevant job is queried to determine the job state. Various job status information and/or states may be culled and provided utilizing the job status records 229 in implementations of the disclosure. For example, a percentage completion of a job may be provided, a current status of the job may be provided, a number of operations completed out of a total number of operations may be provided, and so on. In some implementations, a real-time feedback widget may be implemented to poll for the job status information and present this information on an on-going basis to the user. When a job fails, the job status records 229 may record the operation that failed and provide the user with feedback regarding the reason(s) for the failure.

Implementations of the disclosure provide for resilient scheduling of broker jobs as a result of various failure protections that are implemented for components of the multi-tenant PaaS providing the scheduler 250 and worker components 260. The components that may fail include, but are not limited to, the scheduler 250, the worker components 260, the job, and the elaborated operations of the job.

In one implementation, if the scheduler 250 fails, a number of protections are in place to provide resiliency. The scheduler 250 may be re-spun (re-started) by a watcher process (not shown) of the broker layer 220. In addition, all persisted jobs that the scheduler 250 was handling before failure are reloaded from a file on disk (associated with a server machine of the broker 222) that the jobs were persisted to when scheduled at the scheduler 250. Any jobs that were not added to the scheduler 250 or not yet persisted, are picked up by a broker script that clears pending operations. This broker script for clearing pending operations may run at regular intervals and pick up any jobs that are older than a determined time limit. This time limit may be sufficient for the worker components 260 to get a pending operation and start executing it as part of the worker component's regular operations. If the worker component 260 tries to execute a job and find no elaborated operations, the worker component marks the job as complete and deletes it from the scheduler queue. Furthermore, worker components 260 may be resilient and continue trying to connect to the scheduler 250.

In another implementation, if a worker component 260 fails, a monitoring script or utility detects this failure and re-starts the worker component 260. Any in-progress pending operations are placed back into the scheduler queue after a job timeout period has elapsed. Note that, in some implementations, in order to prevent the need for large job timeout periods, the worker components 260 can frequently "check-in" or "touch" a job to renew the timeout period (e.g., after each elaborated operation of the job completes).

In some implementations, when a job fails, the failed pending operation of the job may be retried once immediately. Then, if the re-try attempt fails, the job is added to the scheduler specifying a delay. In one implementation, the job delay may be calculated as follows: (a) each operation may specify its own retry delay in seconds; or (b) the actual delay for a particular retry attempt is the retry delay multiplied by the retry attempt (i.e., delay=retry_delay*retry_count (retry attempt already made)). A retry count for the operation may be incremented to indicate the number of retries already performed.

As discussed above, each elaborated operation may specify its re-execution parameters. The re-execution parameters may include, but are not limited to, re-execution/re-try as-is without regard to the state of the previous execution attempt, specify that the failed operation be first rolled back before retry, or specify a list of earlier operations (e.g., an array of sub-op IDs) that should be rolled back (along with any sub-ops that depend on them) before they can all be re-attempted. During a retry attempt, first any specified sub-ops are rolled back before retrying the pending op again. Each sub-op could fail a few times (as long as it is less than the retry limit for the sub-op) before being successfully executed and the pending op execution would continue. The admin script to clear the pending ops will also look at failed pending ops that haven't exhausted the retry limit and have not been updated for longer than the retry delay (based on the retry count)+10 minutes (this delay is to allow the workers to get to the job). If it finds any pending ops that fit the criteria, it adds jobs to the scheduler for them.

If a job fails even after all retry attempts, implementations of the disclosure roll back the operation immediately upon the failure of the last retry attempt. If the rollback fails, the pending operation rollback may be retried a fixed number of times. The number of retries can be specified by each sub-op and managed at the sub-op level. Each sub-op could fail a few times (as long as it is less than the rollback retry limit for the sub-op) before being successfully rolled back and the pending op rollback operation would continue. A new field rollback_retry_count may be added to the sub-ops to indicate the number of retries already performed. A job can be added to the scheduler 250 specifying a certain retry delay.

The rollback retry delay may be calculated in the same way as the retry delay for the sub-op. An administrative script to clear the pending ops may also look at failed pending ops that have not exhausted the rollback retry limit and have not been updated for longer than the rollback retry delay (based on rollback retry count)+a determined time period (e.g., 10 minutes) (note: this delay is to allow the worker components 260 to get to the job). If the administrative script finds any pending ops that fit the criteria, it adds jobs to the scheduler 250 for them.

In some implementations, a rollback for a pending sub-op may fail and get stuck, thereby blocking the execution of any subsequent pending ops for that user/domain/application ID associated with the job. A failed job is not skipped in implementations of the disclosure, as out-of-order execution of pending ops is to be avoided. As a result, additional pending ops continue to queue based on user requests up to a certain limit. Once a certain configurable number of pending ops are present, additional pending ops are no longer created and an error is returned to the user instead. The administrative script to clear pending ops may highlight failed jobs in its output.

In further implementations, when a worker component 260 obtains a job for an application/domain/user with a failed/stuck job, the worker component 260 picks up the pending op and examines the op's retry_count as well as the op's last update time. If the retry_count is less than the retry limit for the pending op and the time since the pending op last update is more than the retry delay, then the job is retried. Otherwise, the job is skipped and removed from the scheduler queue. If the retry limit is reached and the job is still stuck, then no further action is taken and manual intervention may be made by administrator or operators of the multi-tenant PaaS. If the retry attempts succeed in executing/rolling back the pending op, then jobs corresponding to any existing pending ops in the queue are added to the scheduler 250.

Figure 3:
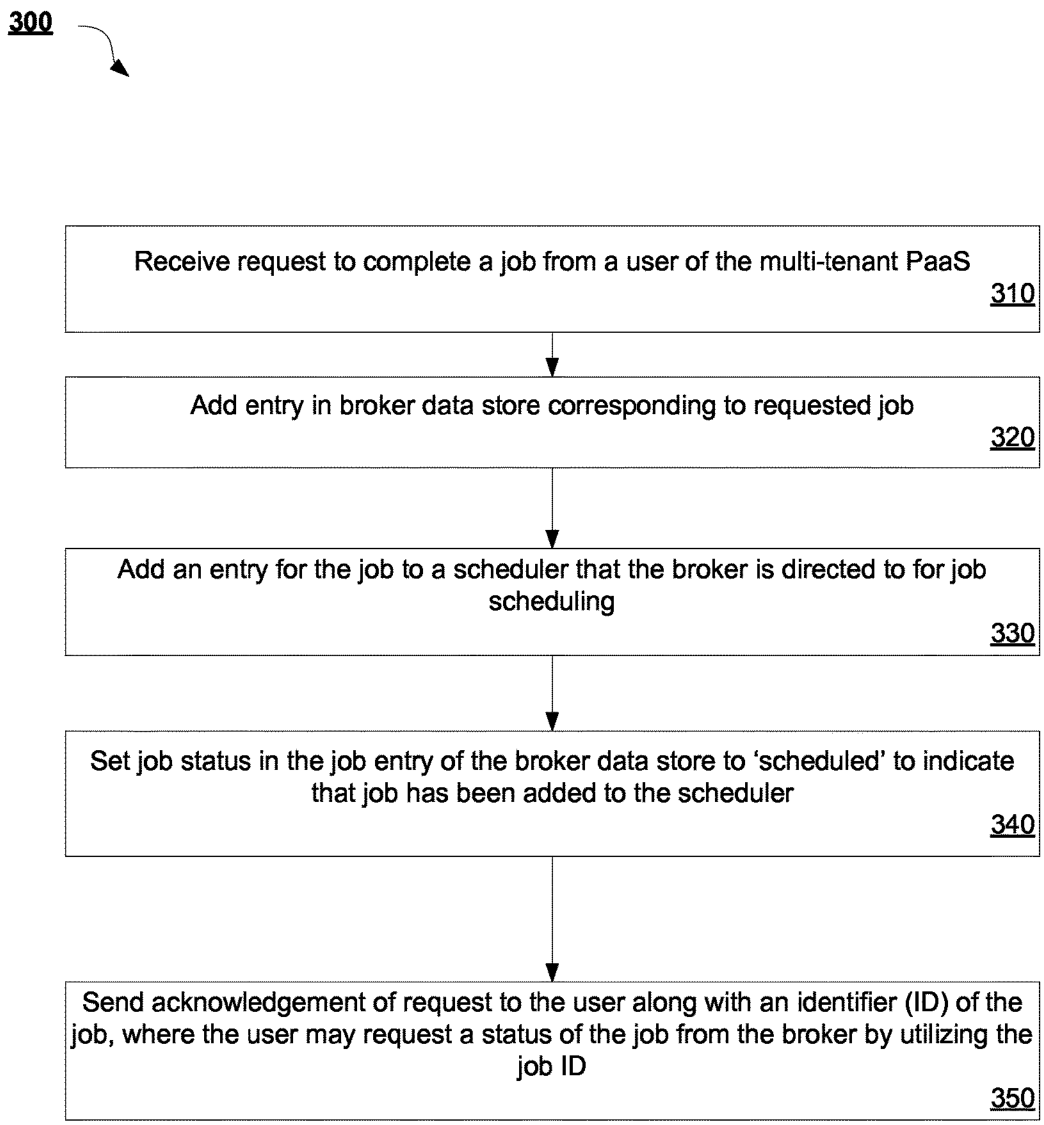
FIG. 3 is a flow diagram illustrating a method for adding a broker job to a scheduler for asynchronous processing in a multi-tenant PaaS system according to an implementation of the disclosure according to an implementation of the disclosure.

FIG. 3 is a flow diagram illustrating a method 300 for adding a broker job to a scheduler for asynchronous processing in a multi-tenant PaaS according to an implementation of the disclosure. Method 300 may be performed by processing logic that may comprise hardware (e.g., circuitry, dedicated logic, programmable logic, microcode, etc.), software (such as instructions run on a processing device), firmware, or a combination thereof. In one implementation, method 300 is performed by broker 222 described with respect to FIG. 2.

Method 300 begins at block 310, where a request to complete a job is received from a user of a multi-tenant PaaS. In one implementation, the job includes, but are not limited to, creating a new application, adding a component to an existing application, building an application, deploying an application, deleting an application, scaling up/down an application, distributing Secure Shell (SSH) keys, distributing environment variables, and so on. The request may arrive at a broker of the multi-tenant PaaS as a HTTP REST API call.

At block 320, an entry is added to a data store of the broker corresponding to the requested job. In one implementation, the entry may include fields including, but not limited to, a job ID, job type, title, description, arguments, child jobs, parent job, state, completion status, retry count, rollback retry count, percentage complete, result, object type, application id, application name, domain name, owner login, creator login, and object URL. In some implementations, this information is provided to the broker as part of the initial request and/or is know by the broker from previous communications with the requesting user. Other information may be provided as part of the communication between the broker and worker components performing the job processing. Then, at block 330, an entry for the job is added to a scheduler that the broker is directed to for job scheduling purposes. In some implementations, there may be a one-to-one correspondence between brokers and schedulers, where all incoming requests to a broker are scheduled to the corresponding scheduler of that broker. However, other implementations are also possible, such as a random assignment of incoming requests to a broker to any of a plurality of schedulers in the PaaS environment. Another implementation may utilize one or more centralized schedulers (e.g., may be scalable for reliability guarantees) to handle requests from all brokers in a PaaS environment. Various scheduler implementations are envisioned and possible in embodiments of the disclosure.

At block 340, a job status of the job entry in the broker data store is set to 'scheduled' (or any other similar signifier) to indicate that the job has been added to the scheduler.

Subsequently, at block 350, the broker sends an acknowledgment of the request to the user along with an ID of the scheduled job. The user may then request a status of the job from the broker utilizing the job ID. As a result, the processing of the job occurs asynchronously with respect to the processing of the actual request for the job.

Figure 4:
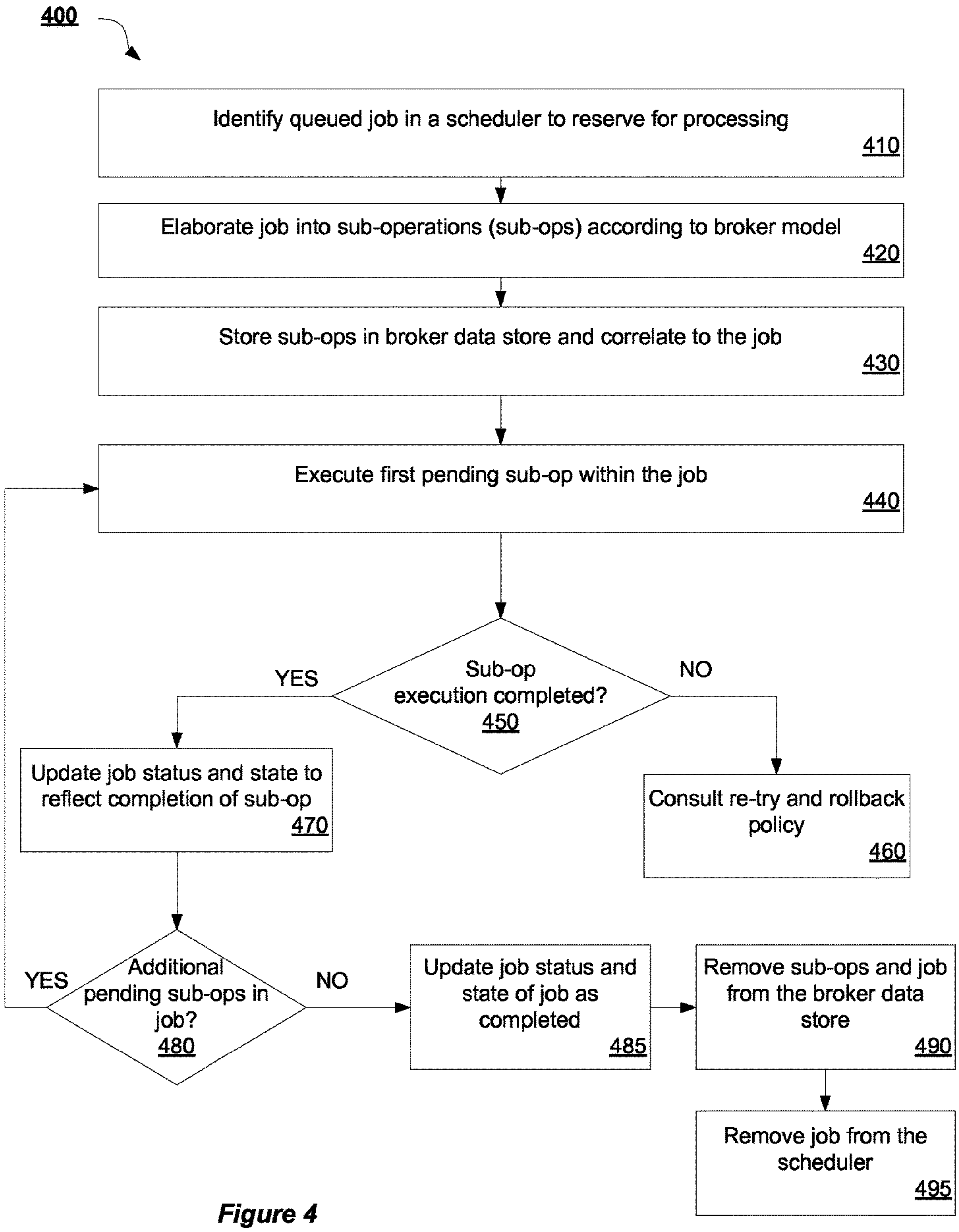
FIG. 4 is a flow diagram illustrating a method for processing a broker job from a scheduler asynchronous from the job request in a multi-tenant PaaS system according to an implementation of the disclosure.

FIG. 4 is a flow diagram illustrating a method 400 for processing a broker job from a scheduler asynchronous from the job request in a multi-tenant PaaS system according to an implementation of the disclosure. Method 400 may be performed by processing logic that may comprise hardware (e.g., circuitry, dedicated logic, programmable logic, microcode, etc.), software (such as instructions run on a processing device), firmware, or a combination thereof. In one implementation, method 400 is performed by scheduler 250 and worker component 260 described with respect to FIG. 2.

Method 400 begins at block 410, where a queued job of a scheduler is identified by a worker component to reserve for processing. A worker component may be a processing thread from a pool of processing threads of a server machine executing the broker. For example, the worker component may be implemented using Backburner™ or Beaneater™ protocols. The worker component may include specialized knowledge of the broker environment and is able to execute broker tasks. For example, the worker component may load a Rails™ environment of the broker. The worker component can load a model of the broker in order to understand what an application is, what a domain is, how to interact with objects of the broker, as well as how to interact with proxies that communicate with the nodes, and so on.

At block 420, the identified job is elaborated into one or more sub-operations (sub-ops) according to the broker model loaded by the worker component. Each sub-op can be retried or rolled back individually. In one implementation, the series of sub-ops for a particular job is pre-configured and known by the worker component as part of the broker model. For example, for the job of creating an application, the sub-ops may include, but are not limited to, determine given cartridges and gear types for the application, determine what locations to obtain the given gears from, associate the obtained gears with the application, determine how many gears are necessary for the application, determine where the those gears belong, determine what cartridges execute on which gears, and so on.

At block 430, the sub-ops are stored in the broker store and correlated to the job. Then, at block 440, the first pending sub-op within the job is executed by the worker component. At decision block 450, it is determined whether the execution of the sub-op completed successfully. If not, then method 400 proceeds to block 460 to consult the re-try and rollback policy specific to the sub-op to determine the next steps for the sub-op and job in terms of execution. Examples of re-try and rollback policies for sub-ops were previously described in more detail.

If the execution of the sub-op does complete successfully, then method 400 proceeds to block 470. At block 460, the job status and state of the job is updated to reflect the completion of the sub-op. Then, at decision block 480, it is determined whether there are any other additional pending sub-ops for the job remaining. If so, then method 400 returns to block 440 to execute the next (i.e., first) pending sub-op within the job.

On the other hand, if there are pending sub-ops remaining to be executed, then method 400 proceeds to block 485 to mark the job status and state of the job to completed. At block 490, the job and its elaborated sub-ops are removed from the broker data store. In addition, at block 495, the job is removed from the scheduler. Note that, in some implementations, the high-level job details, status, and results continue to live (e.g., in a different collection in the broker data store) so that the user can query it to check on the job status and results after completion (e.g., user could check this an hour or even a day later).

Figure 5:
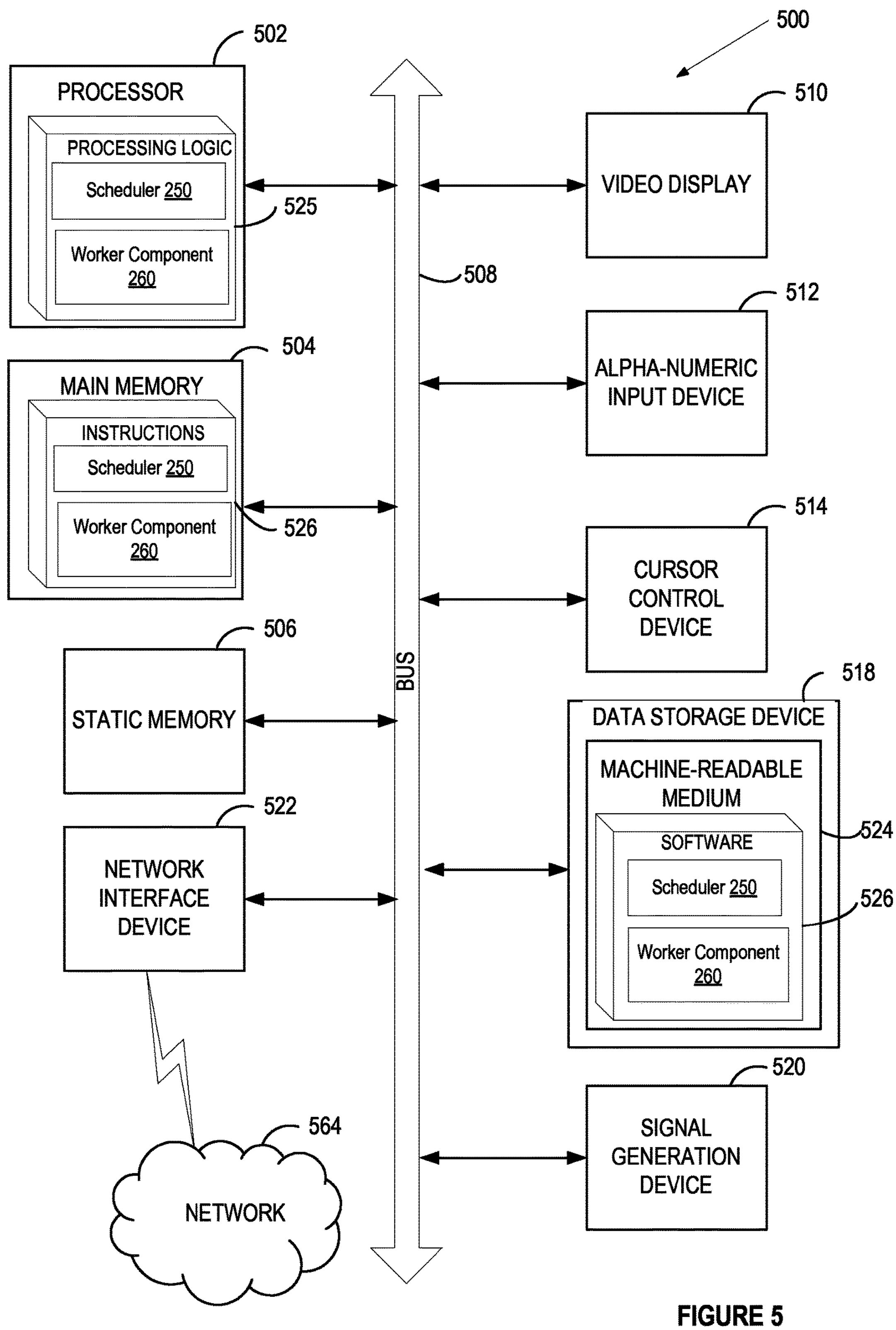
FIG. 5 illustrates a block diagram of one implementation of a computer system.

FIG. 5 illustrates a diagrammatic representation of a machine in the example form of a computer system 500 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 500 includes a processing device 502 (e.g., processor, CPU, etc.), a main memory 504 (e.g., read-only memory (ROM), flash memory, dynamic random access memory (DRAM) (such as synchronous DRAM (SDRAM) or DRAM (RDRAM), etc.), a static memory 506 (e.g., flash memory, static random access memory (SRAM), etc.), and a data storage device 518, which communicate with each other via a bus 508.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic 526 for performing the operations and steps discussed herein.

The computer system 500 may further include a network interface device 522 communicably coupled to a network 564. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 518 may include a machine-accessible storage medium 524 on which is stored software 526 embodying any one or more of the methodologies of functions described herein. The software 526 may also reside, completely or at least partially, within the main memory 504 as instructions 526 and/or within the processing device 502 as processing logic 526 during execution thereof by the computer system 500; the main memory 504 and the processing device 502 also constituting machine-accessible storage media.

The machine-readable storage medium 524 may also be used to store instructions 526 to implement a scheduler 250 and worker component(s) 260 to implement resilient scheduling of broker jobs for asynchronous tasks in a multi-tenant PaaS, such as the scheduler 250 and worker component(s) 260 described with respect to FIG. 2, and/or a software library containing methods that call the above applications. While the machine-accessible storage medium 524 is shown in an example implementation to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

In the foregoing description, numerous details are set forth. It will be apparent, however, that the disclosure may be practiced without these specific details. In some instances, well-known structures and devices are shown in block diagram form, rather than in detail, in order to avoid obscuring the disclosure.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", "referencing", "determining", "providing", "implementing", "translating", "causing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the method steps. The structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Whereas many alterations and modifications of the disclosure will no doubt become apparent to a person of ordinary skill in the art after having read the foregoing description, it is to be understood that any particular implementation shown and described by way of illustration is in no way intended to be considered limiting. Therefore, references to details of various implementations are not intended to limit the scope of the claims, which in themselves recite only those features regarded as the disclosure.

What is claimed is:

1. A method, comprising:

receiving, by a processing device of a broker of a multi-tenant Platform-as-a-Service (PaaS) system from a user device of the multi-tenant PaaS system, a first request to complete a job;

sending, by the processing device to the user device, a processing status of the job;

collecting, by the processing device, information of a plurality of nodes, applications residing on the plurality of nodes, and software components utilized by the applications residing on the plurality of nodes;

generating, by the processing device, a model of the broker using the information, wherein the model represents the plurality of nodes, the applications, and the software components, wherein the model specifies a plurality of sub-operations for the job and corresponding re-execution parameters for retrying or rolling back each of the sub-operations;

invoking, by a worker component of a server device of the broker, the model of the broker to elaborate the job into the plurality of sub-operations, store the plurality of sub-operations in a data store of the broker, and associate the plurality of sub-operations with the job; and executing, by the worker component as part of processing the job, each of the plurality of sub-operations transactionally, wherein first re-execution parameters of a first operation of the plurality of sub-operations comprise an indication that the first operation is to re-execute as-is without regard to a state of a previous execution attempt, wherein second re-execution parameters of a second operation of the plurality of sub-operations specify a list of earlier operations that are to be rolled back before retry along with subsequent operations that depend on the earlier operations in the list.

2. The method of claim 1, wherein the job comprises at least one of creating a new application, adding a component to an existing application, building an application, deploying an application, deleting an application, scaling up/down an application, distributing Secure Shell (SSH) keys, or distributing environment variables.

3. The method of claim 1, further comprising adding, by the processing device, an entry corresponding to the job in the data store of the broker, wherein the entry added to the data store of the broker comprises at least one of a job identifier (ID) field, a job type field, a title field, a description field, arguments, a child jobs field, a parent job field, a state field, a completion status field, a retry count field, a rollback retry count field, a percentage complete field, a result field, an object type field, an application ID field, an application name field, a domain name field, an owner login field, a creator login field, or an object Uniform Resource Locator (URL) field.

4. The method of claim 3, further comprising:

adding, by the processing device, another entry corresponding to the job in a scheduler communicably coupled to the broker; and setting the state field of the entry to a 'scheduled' status to indicate that the job has been added to the scheduler.

5. The method of claim 1, further comprising:

adding, by the processing device, an entry corresponding to the job in the data store of the broker, adding, by the processing device, another entry corresponding to the job in a scheduler communicably coupled to the broker; and identifying one or more of the plurality of sub-operations in the data store of the broker that do not have a 'scheduled' status in a state field to determine whether the one or more sub-operations are to be scheduled at the scheduler, wherein the identifying provides resiliency to the scheduler.

6. The method of claim 1, wherein a roll-back policy flag and a re-try policy flag of the corresponding re-execution parameters for each of the plurality of sub-operations are pre-configured and known by the worker component as part of the model of the broker.

7. The method of claim 1, wherein third re-execution parameters of a third operation of the plurality of sub-operations comprises an indication that the third operation is to be rolled back before retry.

8. The method of claim 1, further comprising:

sending, by the processing device to the user device, an acknowledgment of the first request and an identifier (ID) of the job, wherein the job is processed asynchronously with respect to the sending of the acknowledgment; and receiving, by the processing device, a second request for the processing status of the job, the second request comprising the ID of the job.

9. A system, comprising:

a memory; and a processing device communicably coupled to the memory, the processing device to:

receive, from a user device of a multi-tenant Platform-as-a-Service (PaaS) system, a first request to complete a job;

collect information of a plurality of nodes, applications residing on the plurality of nodes, and software components utilized by the applications residing on the plurality of nodes;

generate a model of a broker, wherein the model represents the plurality of nodes, the applications, and the software components, wherein the model specifies a plurality of sub-operations for the job and corresponding re-execution parameters for retrying or rolling back each of the sub-operations;

invoke the model of the broker of the multi-tenant PaaS system to elaborate the job into the plurality of sub-operations;

store the plurality of sub-operations to a data store of the broker, the plurality of sub-operations corresponding to the job in the data store;

execute each sub-operation of the plurality of sub-operations by a worker component as part of processing of the job;

complete the job when all of the plurality of the sub-operations are executed completely; and for each respective sub-operation of the plurality of sub-operations that does not execute completely, process the respective sub-operation according to the corresponding re-execution parameters corresponding to the respective sub-operation, wherein first re-execution parameters of a first operation of the plurality of sub-operations comprise an indication that the first operation is to re-execute as-is without regard to a state of a previous execution attempt, wherein second re-execution parameters of a second operation of the plurality of sub-operations specify a list of earlier operations that are to be rolled back before retry along with subsequent operations that depend on the earlier operations in the list.

10. The system of claim 9, wherein the job comprises at least one of creating a new application, adding a component to an existing application, building an application, deploying an application, deleting an application, scaling up/down an application, distributing Secure Shell (SSH) keys, or distributing environment variables.

11. The system of claim 9, wherein the processing device is further to: add a first entry corresponding to the job in the data store and a second entry corresponding to the job in a scheduler, wherein the scheduler separates processing of the job from a web request that requests completion of the job.

12. The system of claim 9, wherein, when each sub-operation of the plurality of sub-operations executes completely, the worker component is to update a job status and a job state for the job in the data store of the broker to reflect execution completion of the respective sub-operation.

13. The system of claim 9, wherein the processing device is to update a job status and a job state for the job in the data store of the broker when all of the plurality of sub-operations have executed completely.

14. The system of claim 9, wherein the processing device is further to: add a first entry corresponding to the job in the data store and a second entry corresponding to the job in a scheduler, wherein the corresponding re-execution parameters of each of the plurality of sub-operations provides resiliency to the scheduler.

15. The system of claim 9, wherein the processing device is further to:

send, to the user, an acknowledgment of the first request and an identifier (ID) of the job, wherein the job is processed asynchronously with respect to sending of the acknowledgment;

receive a second request for a processing status of the job, the second request comprising the ID of the job; and reserve the job from a scheduler of the multi-tenant PaaS system.

16. A non-transitory machine-readable storage medium including instructions that, when accessed by a processing device, cause the processing device to:

receive, by the processing device of a broker of a multi-tenant Platform-as-a-Service (PaaS) system from a user device of the multi-tenant PaaS system, a first request to complete a job;

collect information of a plurality of nodes, applications residing on the plurality of nodes, and software components utilized by the applications residing on the plurality of nodes;

generate a model of the broker using the information, wherein the model represents the plurality of nodes, the applications, and the software components, wherein the model specifies a plurality of sub-operations for the job and corresponding re-execution parameters for retrying or rolling back each of the sub-operations;

invoke, by a worker component of a server device of the broker, the model of the broker to elaborate the job into the plurality of sub-operations, store the plurality of sub-operations in a data store, and associate the plurality of sub-operations with the job; and executing, by the worker component as part of processing the job, each of the plurality of sub-operations transactionally, wherein first re-execution parameters of a first operation of the plurality of sub-operations comprise an indication that the first operation is to re-execute as-is without regard to a state of a previous execution attempt, wherein second re-execution parameters of a second operation of the plurality of sub-operations specify a list of earlier operations that are to be rolled back before retry along with subsequent operations that depend on the earlier operations in the list.

17. The non-transitory machine-readable storage medium of claim 16, wherein the job comprises at least one of creating a new application, adding a component to an existing application, building an application, deploying an application, deleting an application, scaling up/down an application, distributing Secure Shell (SSH) keys, or distributing environment variables.

18. The non-transitory machine-readable storage medium of claim 16, wherein the processing device is further to add an entry corresponding to the job in the data store of the broker wherein the entry added to the data store of the broker comprises at least one of a job identifier (ID) field, a job type field, a title field, a description field, arguments, a child jobs field, a parent job field, a state field, a completion status field, a retry count field, a rollback retry count field, a percentage complete field, a result field, an object type field, an application ID field, an application name field, a domain name field, an owner login field, a creator login field, or an object Uniform Resource Locator (URL) field.

19. The non-transitory machine-readable storage medium of claim 16, wherein the processing device is further to:
add an entry corresponding to the job in the data store of the broker,
add another entry corresponding to the job in a scheduler communicably coupled to the broker; and
identify one or more of the plurality of sub-operations in the data store of the broker that do not have a 'scheduled' status in a state field to determine whether the one or more sub-operations are to be scheduled at the scheduler, wherein identification of the one or more sub-operations provides resiliency to the scheduler.

20. The non-transitory machine-readable storage medium of claim 16, wherein a roll-back policy flag and a re-try policy flag of the corresponding re-execution parameters for each of the plurality of sub-operations are pre-configured and known by the worker component as part of the model of the broker.

21. The non-transitory machine-readable storage medium of claim 16, wherein the processing device is further to:
send, by the processing device to the user device, an acknowledgment of the first request and an identifier (ID) of the job, wherein the job is processed asynchronously with respect to sending of the acknowledgment; and
receive, by the processing device, a second request for a processing status of the job, the second request comprising the ID of the job.

* * * * *